US012535258B2

(12) United States Patent
Bates et al.

(10) Patent No.: US 12,535,258 B2
(45) Date of Patent: Jan. 27, 2026

(54) DEPLOYING DEFROST HEATERS TO EVAPORATORS

(71) Applicant: Hill Phoenix, Inc., Conyers, GA (US)

(72) Inventors: Roy Bates, Chesterfield, VA (US); Joshua Christensen, Prince George, VA (US); Jeff Hinkins, Conyers, GA (US)

(73) Assignee: Hill Phoenix, Inc., Conyers, GA (US)

( * ) Notice: Subject to any disclaimer, the term of this patent is extended or adjusted under 35 U.S.C. 154(b) by 366 days.

(21) Appl. No.: 18/295,126

(22) Filed: Apr. 3, 2023

(65) Prior Publication Data

US 2024/0328703 A1 Oct. 3, 2024

(51) Int. Cl.
*F25D 21/08* (2006.01)
*A47F 3/04* (2006.01)
*B23P 15/26* (2006.01)

(52) U.S. Cl.
CPC ............ *F25D 21/08* (2013.01); *A47F 3/0443* (2013.01); *A47F 3/0482* (2013.01); *B23P 15/26* (2013.01)

(58) Field of Classification Search
CPC ................................ F25D 21/08; F25D 21/12
See application file for complete search history.

(56) References Cited

U.S. PATENT DOCUMENTS 4,492,851 A * 1/1985 Carr ........................ F25D 21/08 29/890.035
10,203,145 B2 2/2019 Eget et al.
10,588,429 B2 3/2020 Bates et al.
10,765,231 B2 9/2020 Eget et al.
11,029,066 B2 6/2021 Bates et al.
11,519,676 B2 * 12/2022 Bae ......................... F28F 1/325
11,692,340 B2 * 7/2023 Stahl ....................... E04B 1/388 52/506.01
11,892,210 B2 2/2024 Bates et al.
2005/0262783 A1 * 12/2005 Milburn ................ E06B 3/5427 52/235
2009/0013709 A1 * 1/2009 Kim ........................ F25D 21/08 62/515
2017/0150829 A1 6/2017 Bates et al.
2017/0231403 A1 8/2017 Eget et al.
2018/0010831 A1 1/2018 Bates et al.
2018/0094848 A1 * 4/2018 Jung ..................... F25D 23/006
2018/0103777 A1 4/2018 Eget et al.
2018/0106524 A1 4/2018 Eget et al.
2019/0142185 A1 5/2019 Lade et al.
(Continued)

FOREIGN PATENT DOCUMENTS

JP H04110585 A * 4/1992

*Primary Examiner* — Lionel Nouketcha
(74) *Attorney, Agent, or Firm* — Fish & Richardson P.C.

(57) ABSTRACT

Systems and methods for deploying a defrost heater include a rod heater bracket that includes a body including a first edge and a second edge opposite the first edge. The bracket includes at least one L-shaped slot formed in the body. The L-shaped slot includes an opening along the first edge, and a groove located adjacent to the second edge and configured to retain at least a portion of a rod heater adjacent an evaporator of a refrigerated display case. The rod heater bracket includes a tab configured to be adjusted between an open position to allow access to the groove through the second edge and a closed position to block access to the opening between the second edge and the groove.

20 Claims, 9 Drawing Sheets

(56) References Cited

U.S. PATENT DOCUMENTS

| | | | | |
|---|---|---|---|---|
| 2021/0364200 | A1 | 11/2021 | Bates et al. | |
| 2022/0235995 | A1* | 7/2022 | Arbogast | F25B 39/022 |
| 2024/0041228 | A1 | 2/2024 | Lade et al. | |

* cited by examiner

DEPLOYING DEFROST HEATERS TO EVAPORATORS

TECHNICAL FIELD

The present application relates generally to a refrigeration system within a temperature-controlled display case.

BACKGROUND

Refrigeration systems are often used to provide cooling to temperature-controlled display devices (e.g., cases, merchandisers, etc.) in supermarkets and other similar facilities. Vapor compression refrigeration systems are a type of refrigeration system that provide such cooling by circulating a fluid refrigerant (e.g., a liquid and/or vapor) through a thermodynamic vapor compression cycle. In a vapor compression cycle, the refrigerant is typically (1) compressed to a high temperature/pressure state (e.g., by a compressor of the refrigeration system), (2) cooled/condensed to a lower temperature state (e.g., in a gas cooler or condenser which absorbs heat from the refrigerant), (3) expanded to a lower pressure (e.g., through an expansion valve), and (4) evaporated to provide cooling by absorbing heat into the refrigerant.

SUMMARY

This disclosure describes systems and methods for attaching a defrost heater to an evaporator. The evaporator can be included in a refrigerated display case.

In an example implementation, a rod heater bracket include a body including a first edge and a second edge opposite the first edge; at least one L-shaped slot formed in the body and including an opening along the first edge; a groove located adjacent to the second edge and configured to retain at least a portion of a rod heater adjacent an evaporator of a refrigerated display case; and a tab configured to be adjusted between an open position to allow access to the groove through the second edge and a closed position to block access to the opening between the second edge and the groove.

In an aspect combinable with the example implementation, the bracket includes aluminum.

In another aspect combinable with any of the previous aspects, at least one of a width or a height of the groove are larger than a diameter of the rod heater.

In another aspect combinable with any of the previous aspects, in the open position, the tab is deformed out of a plane of the bracket body.

In another aspect combinable with any of the previous aspects, in the closed position, the tab is aligned in the plane of the bracket body.

In another example implementation, a method for installing a rod heater on an evaporator includes providing a rod heater including a first end and a second end; providing at least one bracket for retaining the rod heater along a length of the evaporator; inserting the at least one bracket between fins of the evaporator such that tubes of the evaporator are inserted into at least one L-shaped slot in the at least one bracket; inserting the rod heater into a groove of the at least one bracket; and adjusting a tab on the at least one bracket to enclose the rod heater in the groove of the at least one bracket.

An aspect combinable with the example implementation further includes securing the first end of the rod heater to a first end of the evaporator.

Another aspect combinable with any of the previous aspects further includes attaching a heater end bracket to an end plate flange of the evaporator; and attaching the first end of the rod heater to the heater end bracket.

In another aspect combinable with any of the previous aspects, at least two brackets are inserted at regular intervals along a length of the evaporator.

Another aspect combinable with any of the previous aspects further includes adjusting the tab on the at least one bracket to allow access to the groove of the one or more brackets.

Another aspect combinable with any of the previous aspects further includes attaching a plenum to the evaporator such that movement of the at least one bracket is restricted.

In another example implementation, a refrigerated display case includes a display case housing; at least one evaporator mounted in the display case housing configured to cool at least a portion of the display case housing; a rod heater positioned adjacent the at least one evaporator; and at least one bracket. The at least one bracket includes a body having a first edge and a second edge opposite the first edge; at least one channel formed in the body, the channel including an opening along the first edge; a notch located adjacent to the second edge and configured to retain at least a portion of the rod heater adjacent the at least one evaporator of the refrigerated display case; and a protrusion configured to be adjusted between an open position to allow access to the notch through the second edge and a closed position to block access to the opening between the second edge and the notch.

In an aspect combinable with the example implementation, the at least one bracket includes aluminum.

In another aspect combinable with any of the previous aspects, a width and a height of the notch are larger than a diameter of the rod heater.

In another aspect combinable with any of the previous aspects, in the open position, the protrusion is deformed out of a plane of the bracket body; and in the closed position the protrusion is aligned in the plane of the bracket body.

In another aspect combinable with any of the previous aspects, a first end of the rod heater is fixed, and a second end of the rod heater is free to translate in a longitudinal direction.

In another aspect combinable with any of the previous aspects, the first end is attached to an end plate flange of the at least one evaporator.

In another aspect combinable with any of the previous aspects, the rod heater includes a 90 degree bend near a first end and a washer crimped near a second end.

Another aspect combinable with any of the previous aspects further includes a heater end bracket attached to an end plate flange of the at least one evaporator, and the first end of the rod heater is attached to the heater end bracket.

In another aspect combinable with any of the previous aspects, the at least one bracket is held in place by a plenum attached to the at least one evaporator.

In another aspect combinable with any of the previous aspects, the rod heater further includes a first washer crimped onto the rod heater adjacent a first end of the rod heater; and a second washer crimped onto the rod heater adjacent a second end of the rod heater.

Particular implementations of the subject matter described in this specification can be implemented to realize one or more of the following advantages. The defrost heater is allowed to float within the groove and the defrost heater has at least one longitudinal direction in which the heater is allowed to expand and contract. This can result in an increased lifetime of the heater as compared with conventional methods of attaching the heater to the evaporator. The brackets are not permanently affixed to the evaporator coil allowing for retrofitting systems in use and/or easy replacement of failed parts in service.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1A:
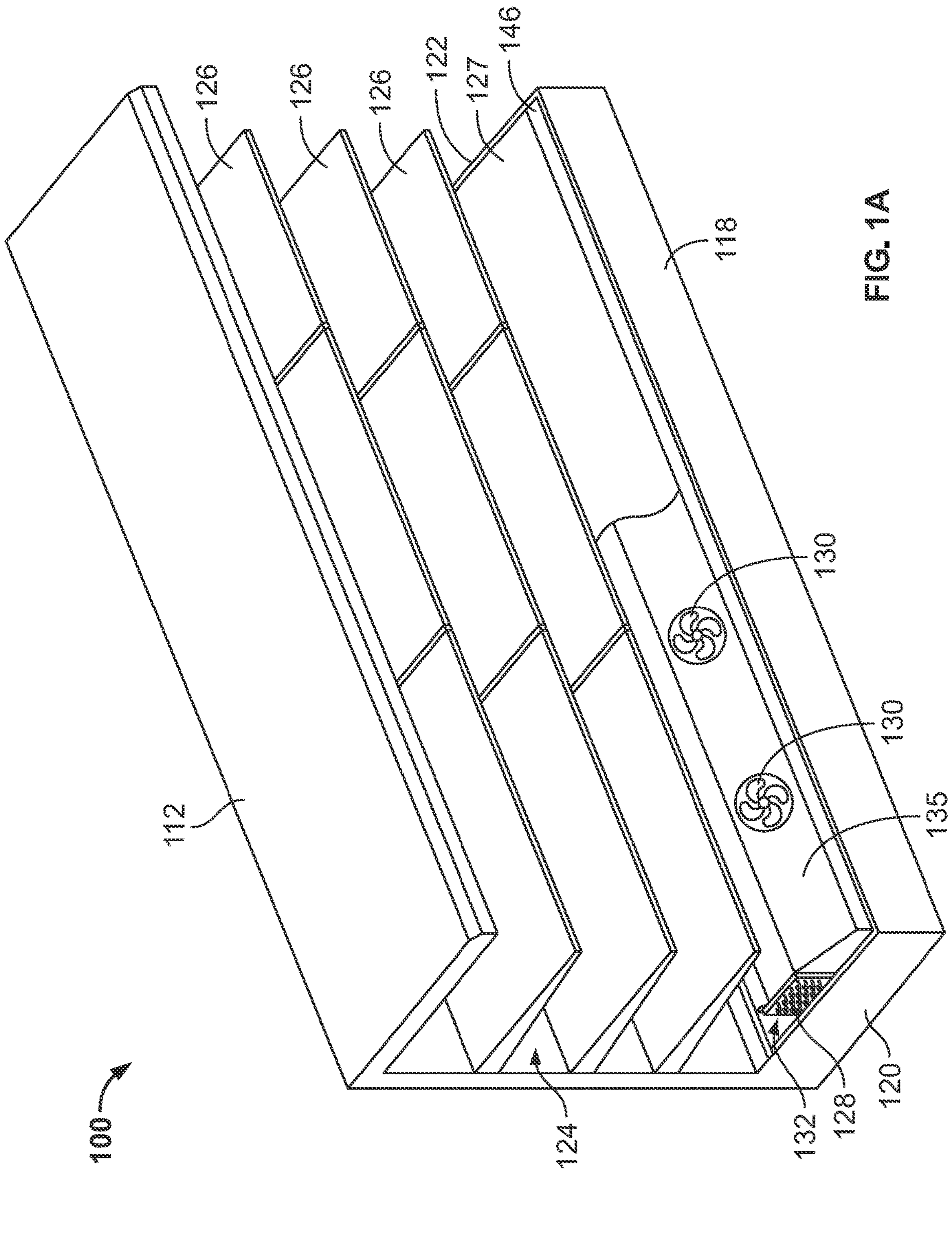
FIGS. 1A-1B show an example refrigerated display case including an evaporator.
Figure 1B:
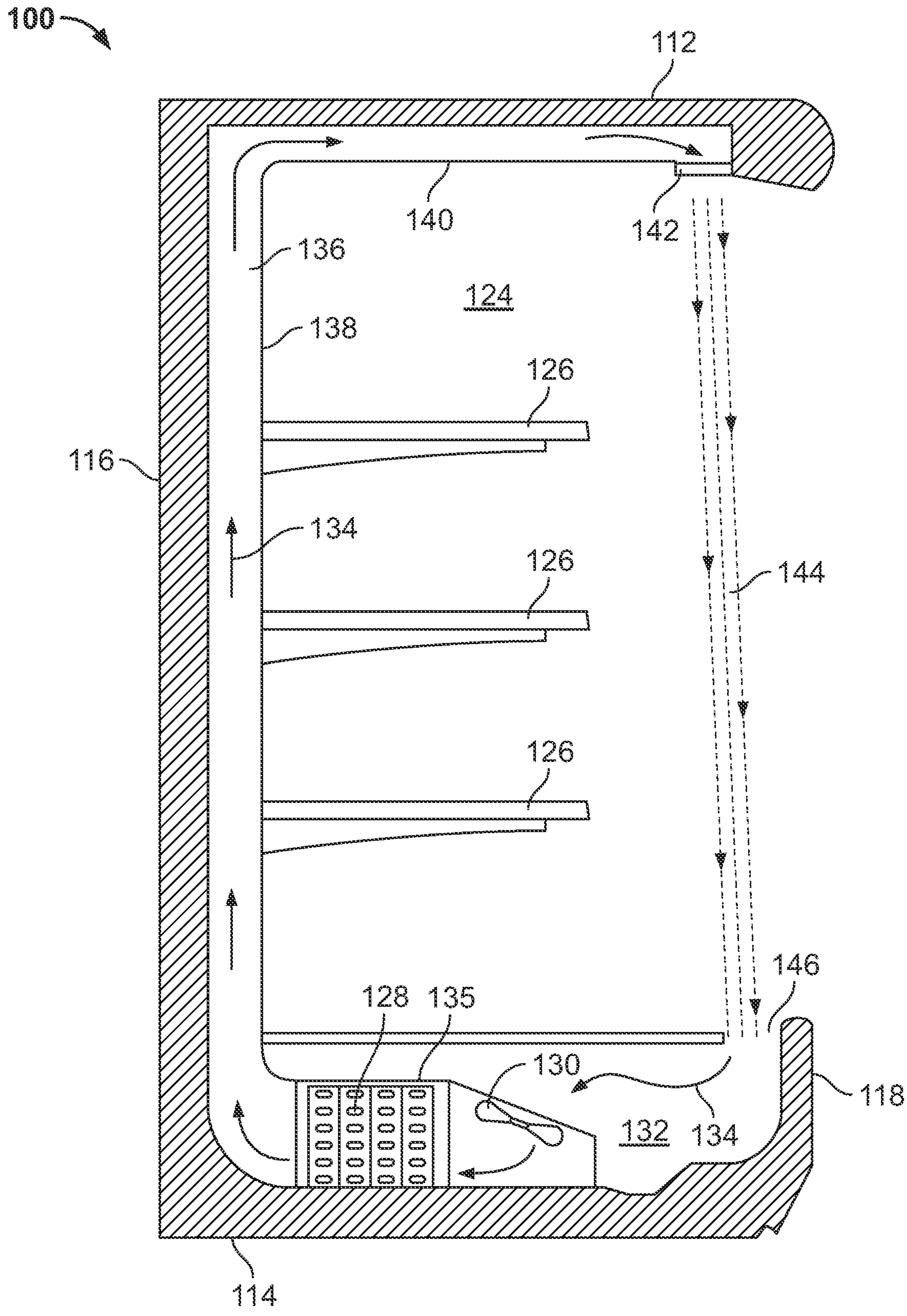

FIGS. 1A-1B show an example implementation of a temperature-controlled display device 100. Temperature-controlled display device 100 can be a refrigerator, a freezer, a refrigerated merchandiser, a refrigerated display case, or other device capable of use in a commercial, institutional, or residential setting for storing and/or displaying refrigerated or frozen objects. For example, temperature-controlled display device 100 may be a service type refrigerated display case for displaying fresh food products (e.g., beef, pork, poultry, fish, etc.) in a supermarket or other commercial setting.

Temperature-controlled display device 100 is shown as a refrigerated display case having a top 112, bottom 114, back 116, front 118, and sides 120-122 that at least partially define a temperature-controlled space 124 within which refrigerated or frozen objects can be stored. In some embodiments, front 118 is at least partially open (as shown in FIGS. 1A-1B) to facilitate access to the refrigerated or frozen objects stored within temperature-controlled space 124. In other embodiments, front 118 may include one or more doors (e.g., hinged doors, sliding doors, etc.) that move between an open position and a closed position. The doors may be insulated glass doors including one or more transparent panels such that the objects within temperature-controlled space 124 can be viewed through the doors (e.g., from the exterior of display device 100) when the doors are closed. Similarly, sides 120-122 may be at least partially open (as shown in FIG. 1A-1B) or closed to define side walls of temperature-controlled space 124.

Temperature-controlled display device 100 is shown to include a plurality of shelves 126-127 upon which refrigerated or frozen objects can be placed for storage and/or display. Shelves 126 may be located at various heights within temperature-controlled space 124. Shelf 127 defines a lower boundary of temperature-controlled space 124 and separates temperature-controlled space 124 from a lower space 132 within which various components of a refrigeration circuit for temperature-controlled display device 100 may be contained.

Space 132 is shown to include a cooling element 128 and a fan 130. Cooling element 128 may include a cooling coil, a heat exchanger, an evaporator, or other component configured to provide cooling for temperature-controlled space 124. Cooling element 128 may be part of a refrigeration circuit and may be configured to absorb heat from an airflow 134 passing over or through cooling element 128. Fan 130 can be installed in a plenum 135 that encloses cooling element 128. The plenum 135 directs airflow 134 through the cooling element 128. The plenum 135 can be attached to the top of the cooling element 128. In some implementations, the plenum can be attached between the cooling element 128 and the rear wall of the temperature-controlled display device 116. Fan 130 may include one or more fans configured to cause airflow 134 through cooling element 128. In some embodiments, fan 130 causes airflow 134 from cooling element 128 to pass through a channel 136 along a rear surface 138 and/or upper surface 140 of temperature-controlled space 124. Rear surface 138 and/or upper surface 140 may include a plurality of outlets distributed along channel 136 (e.g., holes in rear surface 138 and/or upper surface 140 into channel 136) through which airflow 134 can pass from channel 136 into temperature-controlled space 124.

Referring particularly to FIG. 1B, channel 136 is shown to include an outlet 142 configured to direct airflow 134 downward from a front end of channel 136. The downward airflow from outlet 142 may form an air curtain 144 between outlet 142 and inlet 146. Air curtain 144 may help retain chilled air within temperature-controlled space 124 and may prevent the ingression of ambient air (e.g., warmer air from outside temperature-controlled display device 100) into temperature-controlled space 124. Air curtain 144 and airflow 134 may be created by operating fan 130. Fan 130 may be configured to draw airflow 134 through inlet 146 and may cause airflow 134 to pass through cooling element 128. Airflow 134 is chilled by cooling element 128 and is forced into temperature-controlled space 124 by operation of fan 130.

Figure 2:
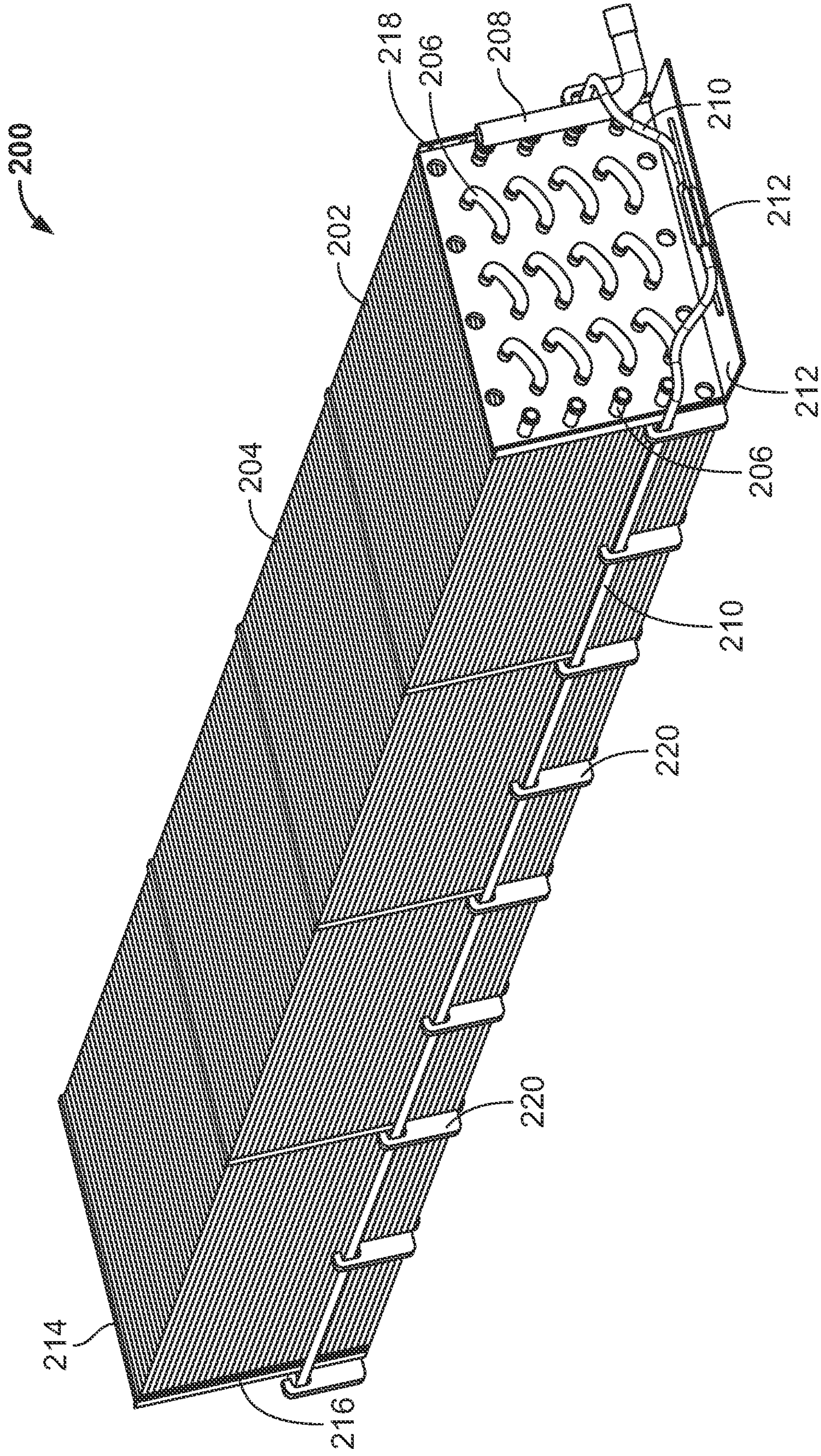
FIG. 2 illustrates an evaporator assembly including an example implementation of a defrost heater that can be implemented in the refrigerated display case of FIGS. 1A-1B.

FIG. 2 shows an example implementation of an evaporator assembly 200 from a refrigeration system, such as the cooling element 128 in the temperature-controlled display device 100 shown in FIGS. 1A-1B. In some implementations, for example, low temperature freezer display cases, the evaporator 202 may accumulate frost on the fins 204 of the evaporator 202. Accumulated frost can decrease the cooling efficiency of the evaporator 202 by decreasing the area for air to flow through the fins 204 of the evaporator 202 and decreasing the heat transferred from the air to the fluid inside the evaporator tubes 206.

In some cases, a heater 210 is installed adjacent to the evaporator 202. The heater 210 can be deployed on the front 216 or the rear 218 of the evaporator 202, or both. The heater 210 radiates heat when activated to defrost the evaporator 202. The heater 210 is turned on intermittently on a predefined schedule, for example, the heater 210 can be turned on once a day for a specified period of time (e.g., 40 minutes). Alternatively, the heater 210 can be activated on an as-needed basis, or the heater 210 can be turned on as determined by a sensor configured to detect frost build up on the evaporator 202. The heater 210 can be a rod heater that extends along the length of the evaporator 202. The heater 210 can include or be made of stainless steel or nickel-chromium-iron alloys. The heater 210 generates heat based on electrical resistance. Electrical wires can be connected to the heater at each end through a rubberized biscuit 212. An end of the heater 210 can be fixed to the evaporator 202 to limit longitudinal movement of the heater.

In the example implementation shown in FIG. 2, removable brackets 220 are inserted between fins 204 of the evaporator 202. The brackets include one or more channels or L-shaped slots on a first edge. The first edge is inserted between the fins 204, and tubes 206 of the evaporator 202 are inserted into the channels or L-shaped slots. The removable brackets include a notch or a groove in which the heater 210 can be placed. Brackets 220 can be placed at regular intervals along the evaporator. For example, a bracket 220 can be placed at equally spaced intervals such as every 15 inches along the length of the evaporator. At least one of the width and height of the groove in the bracket 220 is larger than the diameter of the rod heater allowing the heater to float. The heater provides heat to the evaporator to defrost primarily through radiated heat and not primarily through conduction. As the heater 210 increase in temperature the heater expands due to thermal expansion. Heater 210 is allowed to expand or contract longitudinally, and the notch or groove restricts transverse movement. A protrusion or tab of the bracket 220 is adjusted to allow insertion of the heater into the groove and to retain the heater in the groove.

In some implementations, the evaporator 202 comprises copper coil tubes 206 and aluminum fins 204. At the interface between the fins 204 and the tubes 206, an aluminum collar projects out of the plane of the fin 204 and surrounds the tube 206 passing through the fin 204. The aluminum collar provides a protecting surface for the bracket 220 to interface with when the tubes are inserted into the L-shaped slots of the bracket 220.

Figure 3B:
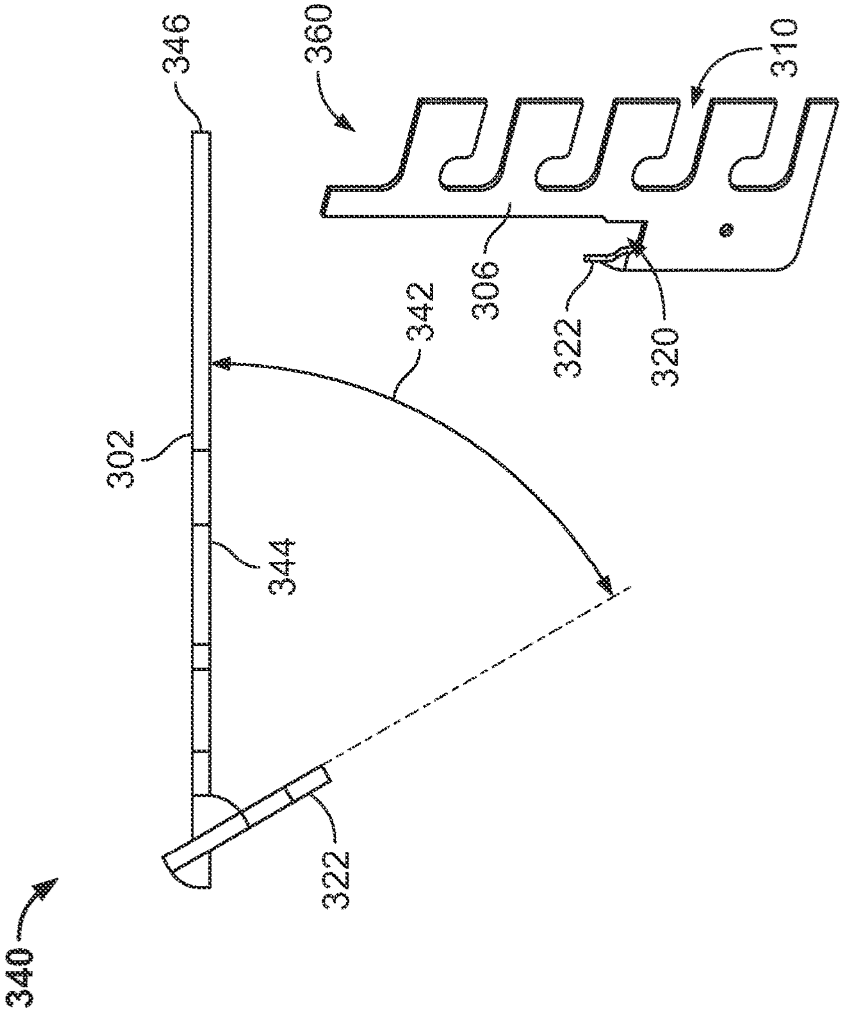
FIGS. 3A-3B illustrate a bracket for retaining a defrost heater near an evaporator.
Figure 3A:
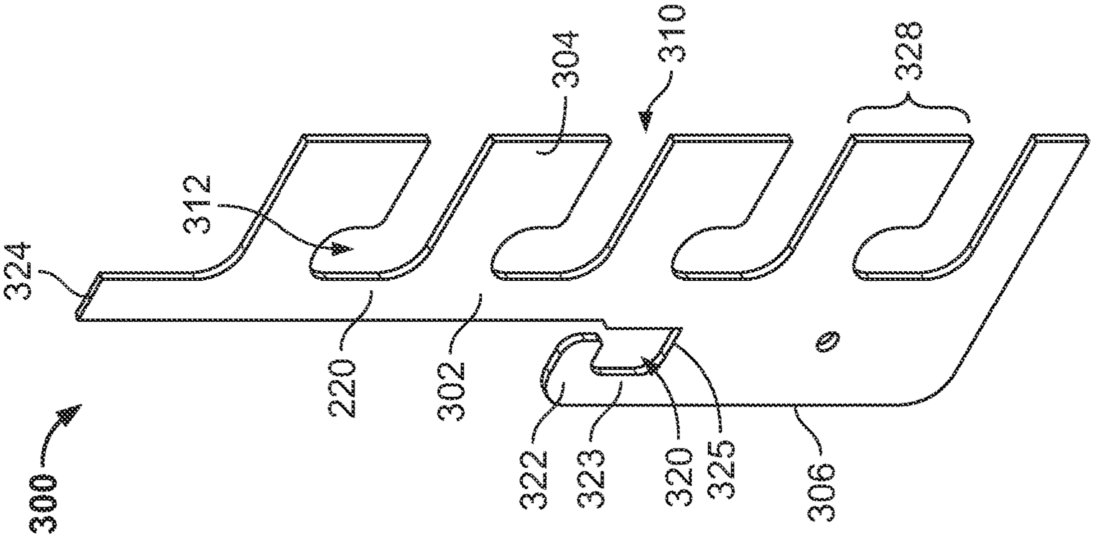

FIG. 3A shows an isometric view 300 of an example implementation of bracket 220 for retaining a defrost heater near an evaporator. The bracket 220 has a body 302 with a first edge 304 and a second edge 306 on the opposite side of the body 302 from the first edge 304. The body 302 has at least one channel or L-shaped slot 310 including an opening along the first edge 304. The height of the channel or L-shaped slot 310 is large enough that tubes (e.g., 206) of an evaporator (e.g., 202) can be inserted into the slot. The L-shaped slots 310 are oriented such that when the tubes 206 of the evaporator 202 are inserted into the slots 310, the tubes of the evaporator are seated at the end of the channel or in the vertical portion 312 of the L-shaped slot 310 thereby restricting transverse motion of the bracket. The bracket can comprise aluminum. The second edge 306 of the bracket 220 has a notch or a groove 320 configured to hold a defrost heater. A protrusion or tab 322 on the bracket 220 can be adjusted to an open position to allow access to the notch or groove 320 through the second edge 306. In a closed position the protrusion or tab is aligned in the plane of the body of the bracket and blocks access to the groove through the second edge. The notch or groove 320 has a height 323 and a width 325. At least one of the height 323 and the width 325 can be larger than a diameter of the rod heater. Spacing 328 between adjacent channels or L-shaped slots is determined based on the spacing of tubes in the evaporator. The height of the bracket 220 can be similar to the height of the evaporator 202. When the bracket 220 is installed on the evaporator 202 with the evaporator tubes 206 seated in the vertical portion 312 of the L-shaped slots 310, the top 324 of the bracket can be flush with the top 214 of the evaporator 202 or slightly below the top 214 of the evaporator 202. A plenum (e.g., 135) covering the top 214 of the evaporator 202 can restrict vertical movement of the bracket 220 thereby retaining the tubes 206 of the evaporator 202 within the vertical portion 312 of the L-shaped slots 310.

In some implementations, the channel or slot 310 can have a shape other than L-shape. For example, a slot or channel can be straight with an angle greater than or less than 90 degrees relative to the first edge. After installation of a plenum, vertical and transverse motion of the bracket can be restricted by the angle of the channel or slot.

FIG. 3B shows a top view 340 of an example implementation of bracket 220 showing the protrusion or tab 322 adjusted in the open position. In the open position, the protrusion or tab 322 is deformed out of the plane of the body of the bracket. For example, the protrusion or tab 322 may be twisted to an angle 342 of 45 degrees, 60 degrees, or 90 degrees from the face 344 of the body 302. The protrusion or tab 322 can be adjusted to the open position during the manufacturing of the bracket. The protrusion or tab 322 can be adjusted to the open position during the installation of the bracket and heater onto the evaporator. The thickness 346 of the bracket is less than the width of the space between fins of the evaporator 202. An isometric view 360 shows the tab 322 in the open position, allowing access to the groove 320 through the second edge 306.

Figure 4B:
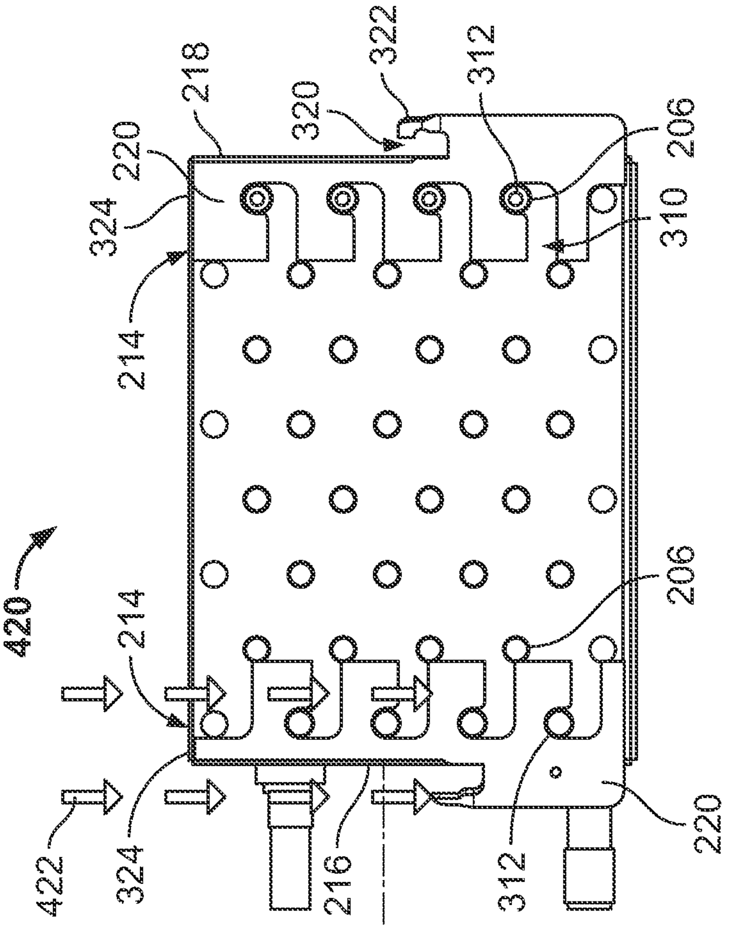
FIGS. 4A-4B show cross section views of an evaporator assembly during installation of a bracket to attach a defrost heater.
Figure 4A:
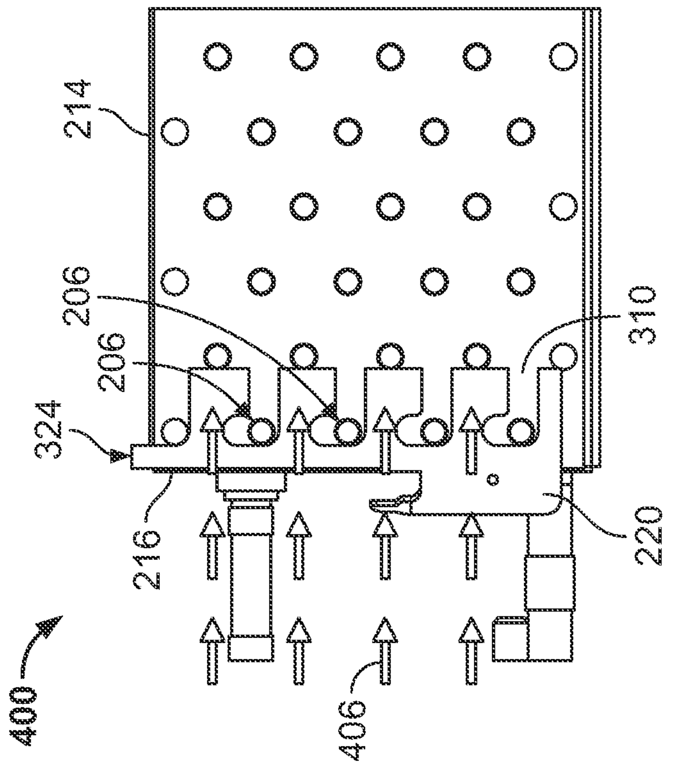

FIGS. 4A-4B show example cross sections of the evaporator during installation of the bracket. FIG. 4A shows a partial cross section 400 of the evaporator 202. At least one bracket 220 is provided. The bracket 220 is inserted 406 between fins 204 of the evaporator 202 such that tubes 206 of the evaporator are inserted into L-shaped slots 310 of the bracket 220. During insertion 406 of the bracket 220 between the fins 204 of the evaporator 202, the top 324 of the bracket 220 can be above the level of the top 214 of the evaporator 202. FIG. 4B shows a full cross-section 420 of the evaporator 202. After the bracket 220 is fully inserted, the bracket can be pushed down 422 such that the coil tubes 206 enter the vertical portion 312 of the L-shaped slot 310 in the bracket 220. After the bracket 220 is pushed down 422, the top 324 of the bracket 220 can be flush with the top 214 of the evaporator 202 or slightly below the top 214 of the evaporator 202. FIG. 4B depicts brackets 220 inserted on both the front 216 and back 218 of the evaporator 202. The layout of the L-shaped slots 310 can depend on the location and layout of the coil tubes 206. Notably the bracket 220 installed on the front 216 of the evaporator 202 has a slightly different geometry than the bracket 220 inserted on the back 218 of the evaporator 202. In both cases, the tubes 206 are fully inserted into the L-shaped slots 310 and the top 324 of the brackets 220 are flush with or slightly below the top 214 of the evaporator 202.

As shown in FIGS. 4A-4B, the tabs 322 are configured in the open position. The tabs 322 can be configured in the closed position during insertion and adjusted to the open position at a different step of the installation. A heater 210 is provided and inserted into the groove 320 through the opening formed by the tab 322 in the open position. The tabs 322 of the brackets 220 are adjusted to the closed position to close the groove 320 of the brackets 220 and retain the heater 210 in the groove 320. A plenum can be installed on or attached to the top 214 of the evaporator 202. The heater 210 can be fixed or attached to the evaporator 202 at one or more ends.

Figure 5A:
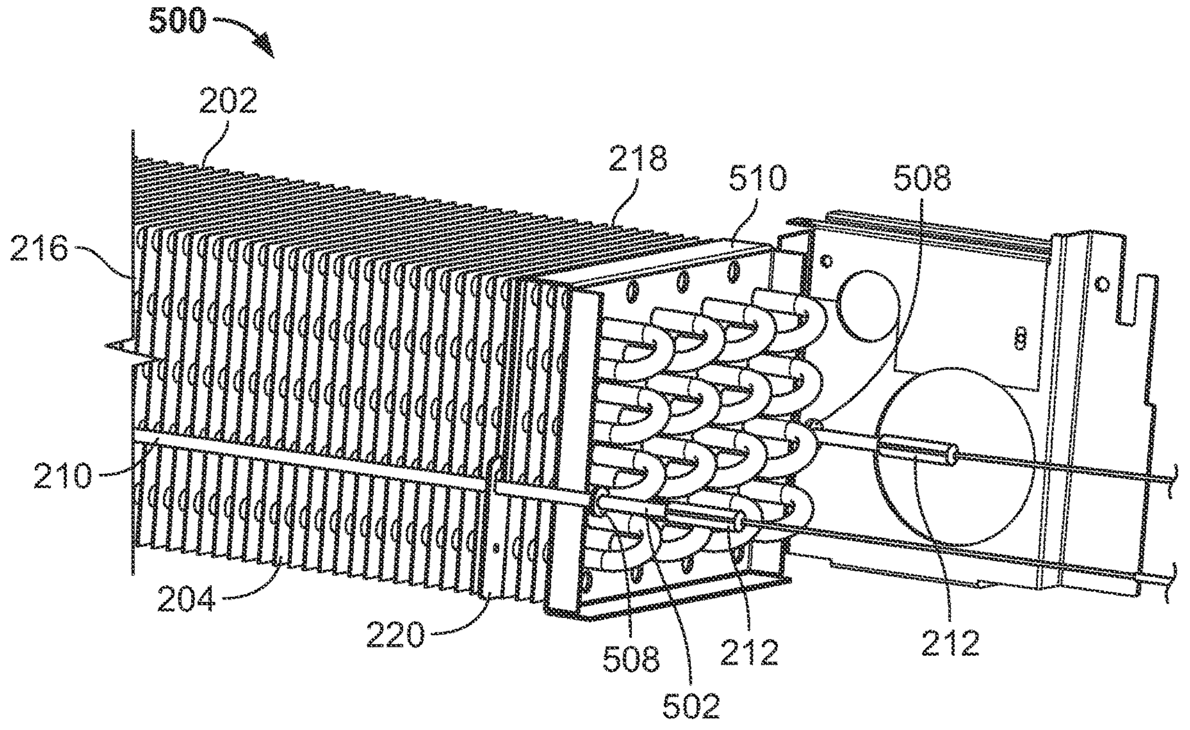
FIGS. 5A-5B illustrate an example defrost heater with a washer crimped at each end of the heater.
Figure 5B:
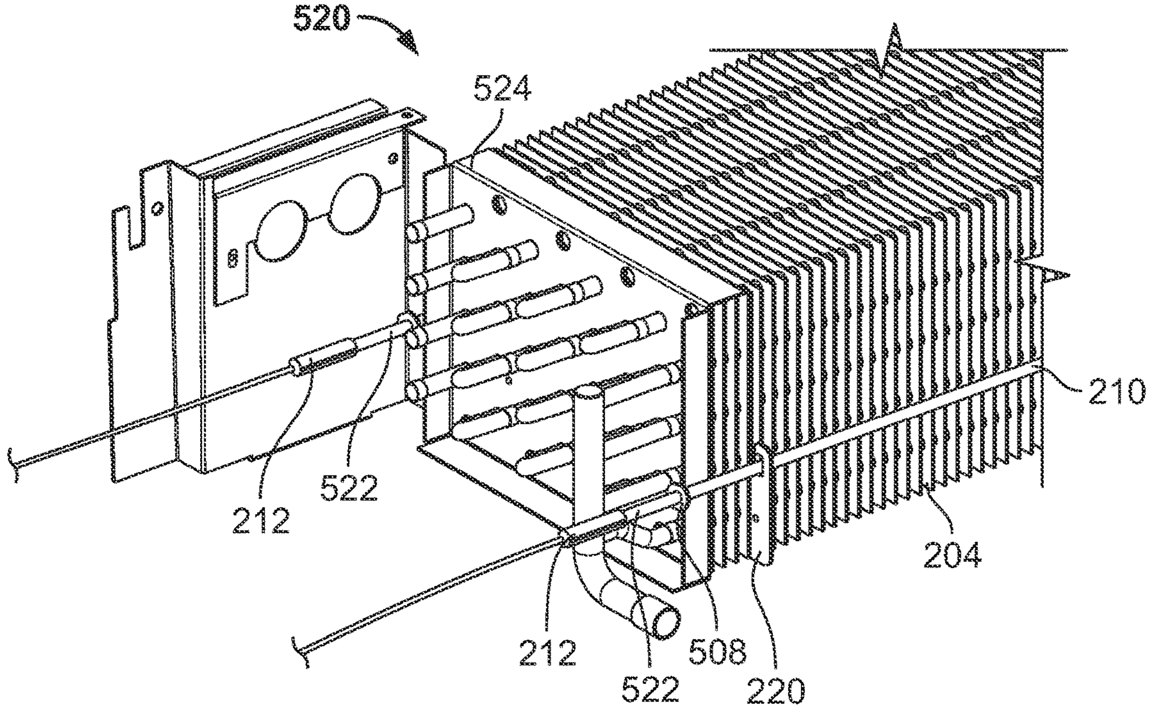

FIGS. 5A-5B show an embodiment of an evaporator assembly 200 in which the heater 210 is not fixedly attached to the evaporator 202. FIG. 5A shows a first end 500 of the evaporator 202. A first end 502 of the rod heater 210 has a washer 508 crimped or attached to the rod heater 210. The washer 508 is placed between the end flange 510 of the evaporator 202 and the electronics biscuit 212. The washer 508 is sized such that the washer 508 is unable to pass the end flange 510 of the evaporator 202 thereby protecting the biscuit 212. In this example, the heater 210 installed on the front 216 and back 218 of the evaporator 202 are both configured to allow free longitudinal motion of the heater 210 constrained only by the location of the washers 508. FIG. 5B shows the second end 520 of the evaporator 202 opposite the end shown in FIG. 5A. This second end 520 of the evaporator 202 shows second ends 522 of the rod heater 210 that have washers 508 crimped to the heater between the end flange 524 of the evaporator 202 and the electronics biscuit 212. In this embodiment, the heater 210 is not fixed at either end, and the longitudinal movement of the heater 210 is constrained by the location and attachment of the washers 508. A plenum installed on the evaporator 202 can have holes sized sufficiently to accommodate the heater 210 with holes smaller than an outer diameter of the washer 508 installed on the heater 210 thereby preventing the washer 508 from passing through the hole.

Figure 6A:
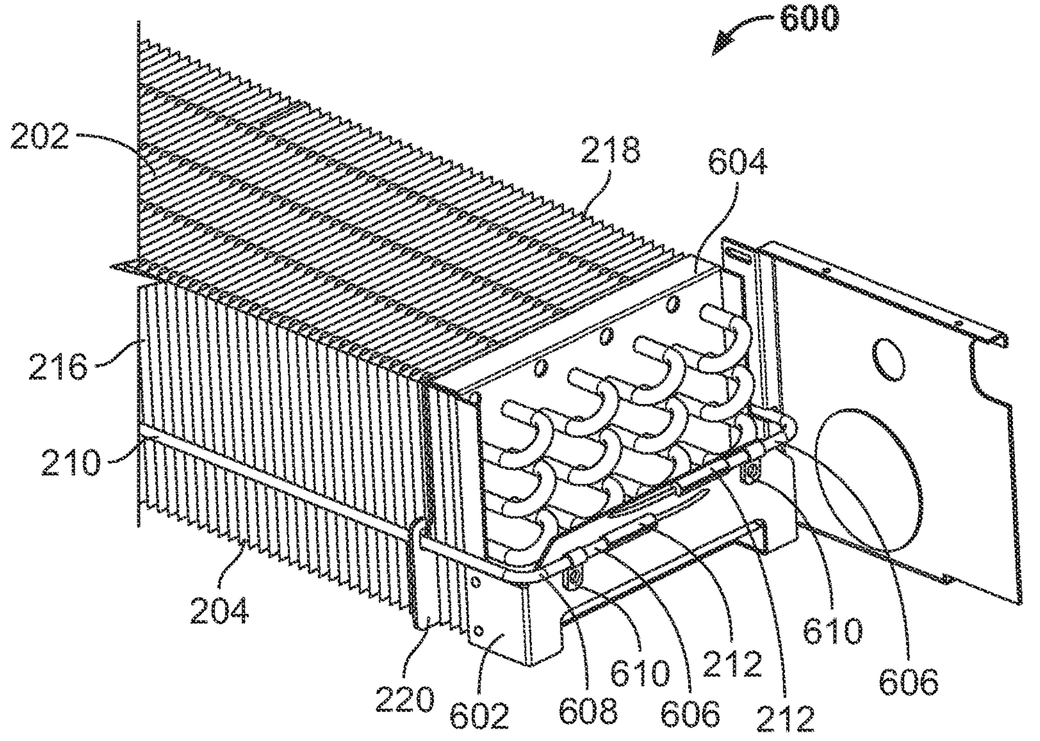
FIGS. 6A-6B show an example defrost heater having one end attached to a bracket and the opposite end allowed to move freely.
Figure 6B:
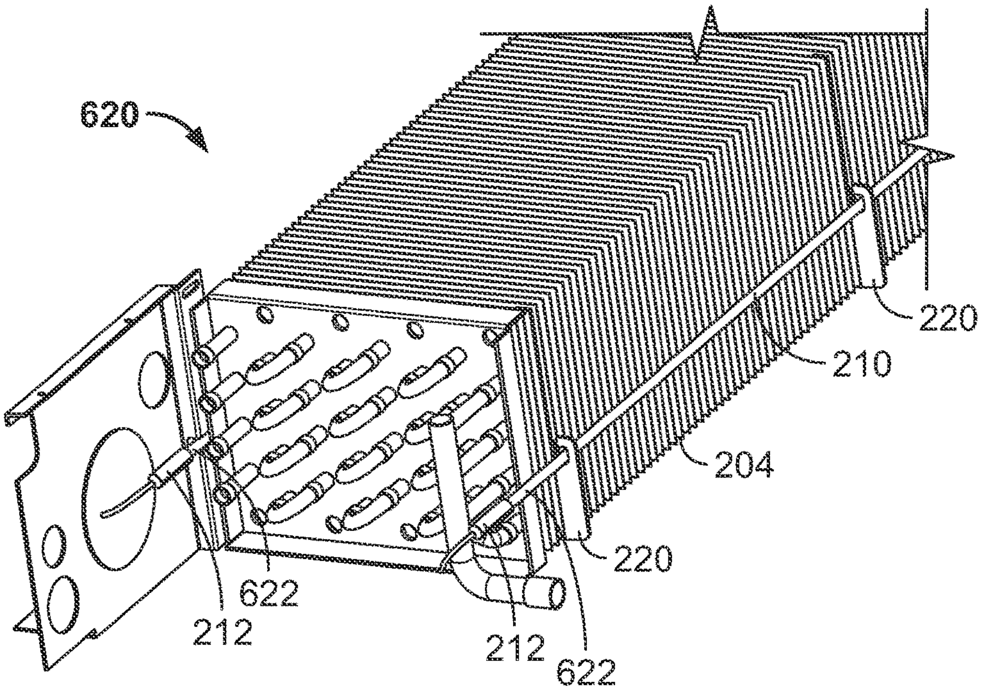

FIGS. 6A-6B show an example embodiment of a defrost heater 210 attached to an evaporator 202. FIG. 6A shows a first end 600 of the evaporator 202. In this embodiment, a heater end bracket 602 is provided and attached to the end flange 604 of the evaporator 202. The ends 606 of the heaters have a 90 degree bend 608 in the heater 210 near the end 606 of the heater 210. The 90 degree bend 608 can limit longitudinal movement of the heater 210. The heaters 210 are attached to the heater end bracket 602 to fix the first end 606 of the heater 210 in place. For example, the heaters 210 can be attached to the heater end bracket 602 by a clamp 610 surrounding the heater 210 with the clamp 610 screwed to the heater end bracket 602. FIG. 6B shows a second end 620 of the evaporator 202 and second ends 622 of the defrost heaters 210. The second end 622 of the defrost heater 210 does not have a washer or other means of constraining the longitudinal motion of the heater 210.

Figure 7A:
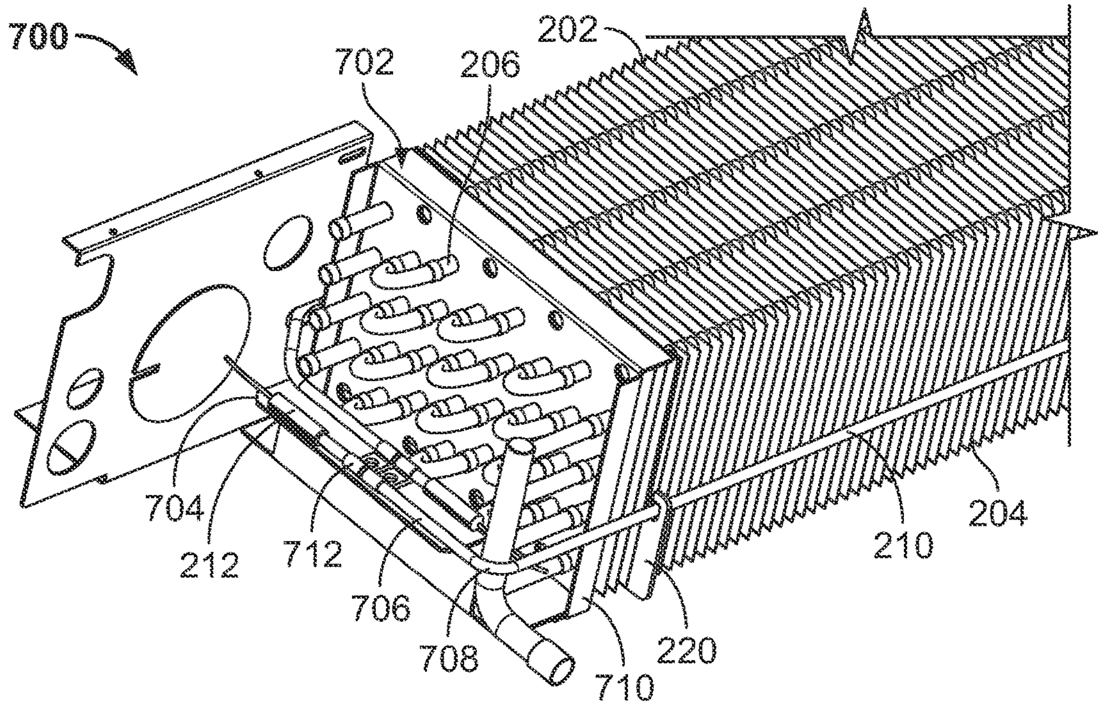
FIGS. 7A-7B show example embodiments including ends of a defrost heater attached to a shelf and attached to a surface.

FIG. 7A shows a portion 700 of an evaporator assembly that includes a defrost heater 210. In this example, the heater 210 is attached to the evaporator 202 at an end 702. A heater shelf 704 is configured for ends 706 of the heaters 210 to be attached to the shelf 704. The ends 706 can have one or more bends 708 to avoid coil tubes 206. The heater shelf 704 is attached to an end flange 710 of the evaporator 202. Clamps 712 can surround the heater ends 706 between the electronics biscuit 212 and the bends 708. The clamps 712 can be attached to the heater shelf 704, for example, by a screw.

Figure 7B:
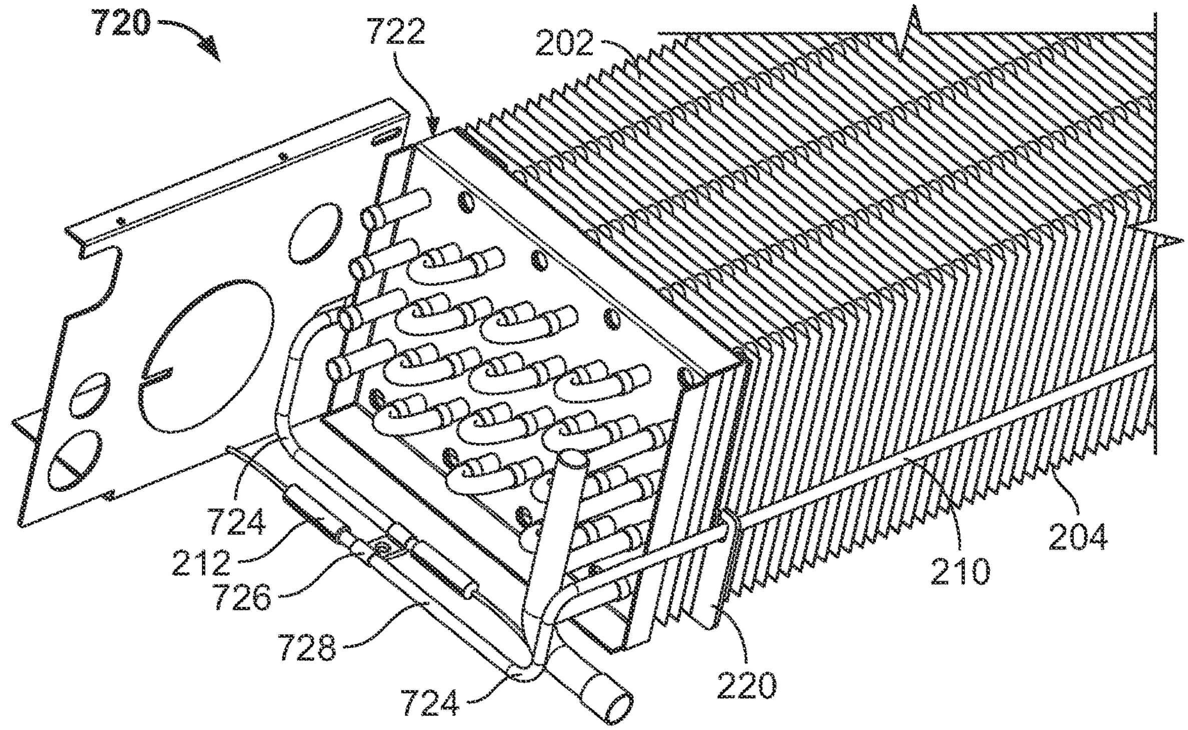

FIG. 7B shows a portion 720 of an evaporator assembly including an example implementation of attaching defrost heaters 210 to an end 722 of the evaporator 202. The heaters 210 include bends 724 such that the heater can be fixed to a surface beneath the evaporator 202. Clamps 726 can surround the ends 728 of the heater. The clamps 726 can be attached to the surface beneath the evaporator 202, for example, by a screw.

Figure 8:
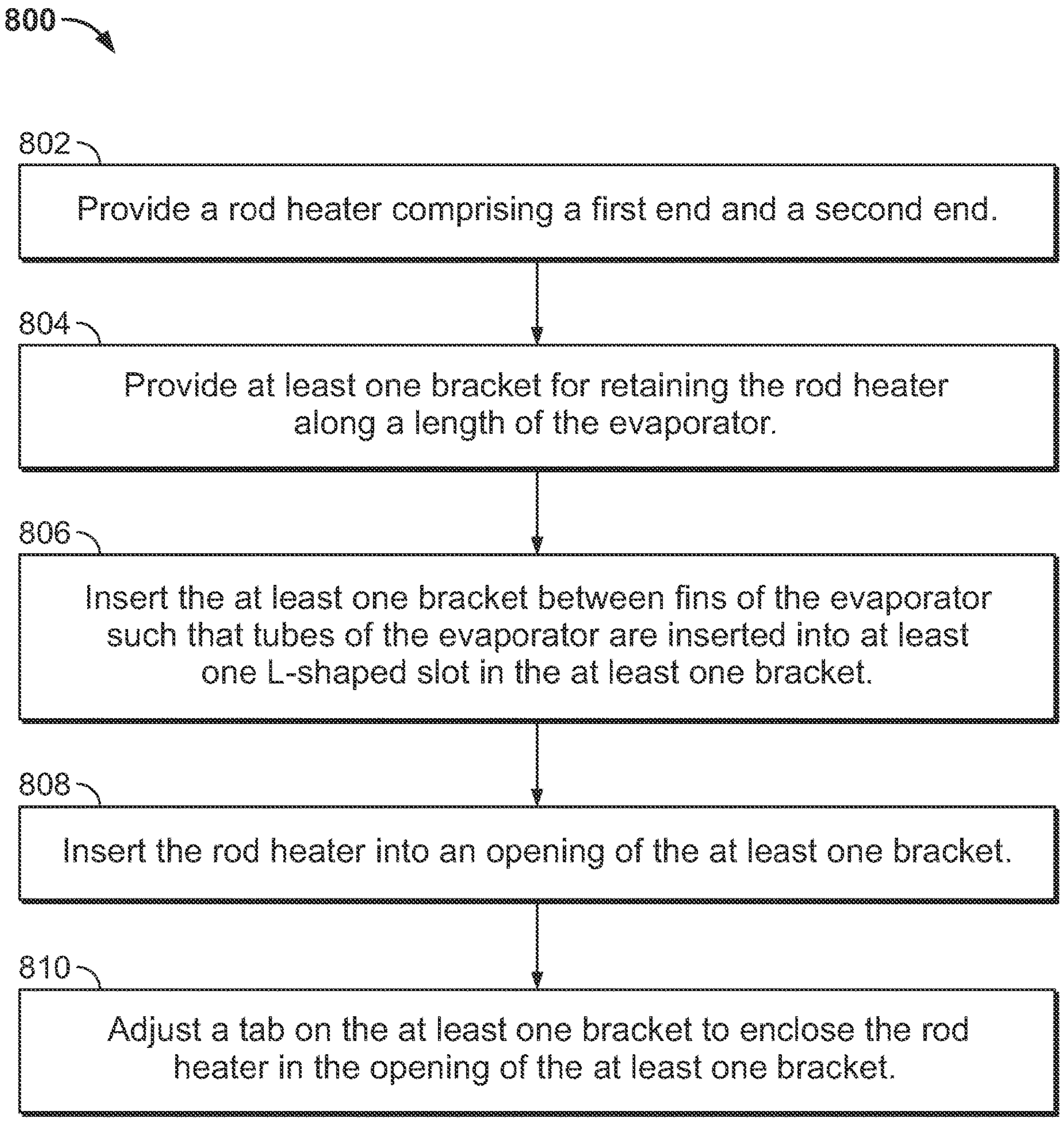
FIG. 8 is a flow chart of an example method of installing a defrost heater.

FIG. 8 shows a flow chart of an example method 800 for installing a rod heater near an evaporator. A rod heater is provided that includes a first end and a second end (step 802). In some cases, more than one rod heater is provided. For example, a rod heater can be provided for deploying on the front of the evaporator and a rod heater can be provided for deploying on the rear of the evaporator.

At least one bracket for retaining the rod heater along a length of the evaporator is provided (step 804). The bracket can be as described with relation to FIGS. 3A-3B. The number of brackets provided can depend on the length of the evaporator with longer evaporators being provided with more brackets than a shorter evaporator.

The at least one bracket is inserted between fins of the evaporator such that tubes of the evaporator are inserted into L-shaped slots in the at least one bracket (step 806). This installation can be as depicted in FIGS. 4A-4B. In some cases, if the slot or channel of the bracket is not L-shaped, the bracket can be inserted according to the geometry of the slot or channel. In some implementations, two or more brackets are inserted at regular intervals along the length of the evaporator. For example, the two or more brackets can be spaced a pre-determined distance from one another. In another example, the distance between adjacent brackets can be determined by the length of the evaporator divided by the number of brackets.

The rod heater is inserted into an opening (e.g., a notch or groove) of the at least one bracket (step 808). In some aspects, the tab or protrusion on the at least one bracket can be adjusted to allow access to the opening prior to inserting the rod heater into the notch or groove.

The tab or protrusion on the at least one bracket is adjusted to enclose the rod heater in the opening of the at least one bracket (step 810). The tab or protrusion can be adjusted to be in-plane with the body of the bracket. In some cases, the tab or protrusion can be out of the plane of the bracket body if the remaining opening of the opening is less than the diameter of the rod heater.

In some implementations, the first end of the rod heater is secured to a first end of the evaporator. FIGS. 2, 6A, and 7A-7B depict methods of attaching an end of the rod heater to ends of the evaporator. In some cases, a heater end bracket is attached to an end plate flange of the evaporator; and the first end of the rod heater is attached to the heater end bracket.

In some cases, a plenum is attached to the evaporator such that movement of the at least one bracket is restricted. For example, a plenum attached to the top of an evaporator can prevent the bracket from vertical movement. The geometry of the bracket can couple vertical movement and horizontal movement (e.g., L-shaped slots) such that when vertical movement is restricted, horizontal movement is also restricted thereby retaining the bracket in the installed position.

An example method for operating the heater can include determining a frequency to operate the heater. In some cases, the frequency can be once a day. A duration of operating the heater is also determined. For example, the heater can be operated in an "on" condition for 40 minutes. The duration of operation can depend on the anticipated amount of accumulated frost, the heater operating temperature, and the ambient temperature in which the temperature-controlled display device is operating. The heater can be operated based on the determined frequency and the determined duration. In some implementations, the heater can be electrically coupled to a controller that is operative to activate the heater according to the determined frequency and duration. In some cases, sensors can be deployed on or near the evaporator to determine the frequency and duration at which to operate the heater.

A number of embodiments of these systems and methods have been described. Nevertheless, it will be understood that various modifications may be made without departing from the scope of this disclosure. For example, the attachment methods of the ends of the heaters to the evaporator can be interchanged among the embodiments. Accordingly, other embodiments are within the scope of the following claims.

What is claimed is:

1. A rod heater bracket comprising:

a body comprising a first edge and a second edge opposite the first edge;

at least one L-shaped slot formed in the body, the L-shaped slot comprising an opening along the first edge with a vertical portion at an end of the L-shaped slot that is sized to receive and support an evaporator tube of an evaporator of a refrigerated display case;

a groove located adjacent to the second edge and configured to retain at least a portion of a rod heater adjacent the evaporator of the refrigerated display case; and a tab configured to be adjusted between an open position to allow access to the groove through the second edge and a closed position to block access to the opening between the second edge and the groove.

2. The rod heater bracket of claim 1, wherein the bracket comprises aluminum.

3. The rod heater bracket of claim 1, wherein at least one of a width or a height of the groove are larger than a diameter of the rod heater.

4. The rod heater bracket of claim 1, wherein in the open position, the tab is deformed out of a plane of the bracket body; and in the closed position the tab is aligned in the plane of the bracket body.

5. A method for installing a rod heater on an evaporator, comprising:

providing a rod heater comprising a first end and a second end;

providing at least one bracket for retaining the rod heater along a length of the evaporator;

inserting the at least one bracket between fins of the evaporator such that tubes of the evaporator are inserted into at least one L-shaped slot in the at least one bracket;

inserting the rod heater into a groove of the at least one bracket; and adjusting a tab on the at least one bracket to enclose the rod heater in the groove of the at least one bracket.

6. The method of claim 5, further comprising securing the first end of the rod heater to a first end of the evaporator.

7. The method of claim 5, further comprising:

attaching a heater end bracket to an end plate flange of the evaporator; and attaching the first end of the rod heater to the heater end bracket.

8. The method of claim 5, wherein at least two brackets are inserted at regular intervals along a length of the evaporator.

9. The method of claim 5, further comprising adjusting the tab on the at least one bracket to allow access to the groove of the one or more brackets.

10. The method of claim 5, further comprising attaching a plenum to the evaporator such that movement of the at least one bracket is restricted.

11. A refrigerated display case, comprising:

a display case housing;

at least one evaporator mounted in the display case housing configured to cool at least a portion of the display case housing;

a rod heater positioned adjacent the at least one evaporator; and at least one bracket, comprising:

a body having a first edge and a second edge opposite the first edge;

at least one channel formed in the body, the channel comprising an opening along the first edge;

a notch located adjacent to the second edge and configured to retain at least a portion of the rod heater adjacent the at least one evaporator of the refrigerated display case; and a protrusion configured to be adjusted between an open position to allow access to the notch through the second edge and a closed position to block access to the opening between the second edge and the notch.

12. The refrigerated display case of claim 11, wherein the at least one bracket comprises aluminum.

13. The refrigerated display case of claim 11, wherein a width and a height of the notch are larger than a diameter of the rod heater.

14. The refrigerated display case of claim 11, wherein in the open position, the protrusion is deformed out of a plane of the bracket body; and in the closed position the protrusion is aligned in the plane of the bracket body.

15. The refrigerated display case of claim 11, wherein a first end of the rod heater is fixed, and a second end of the rod heater is free to translate in a longitudinal direction.

16. The refrigerated display case of claim 15, wherein the first end is attached to an end plate flange of the at least one evaporator.

17. The refrigerated display case of claim 11, wherein the rod heater comprises a 90 degree bend near a first end and a washer crimped near a second end.

18. The refrigerated display case of claim 17, further comprising a heater end bracket attached to an end plate flange of the at least one evaporator, the first end of the rod heater being attached to the heater end bracket.

19. The refrigerated display case of claim 11, wherein the at least one bracket is held in place by a plenum attached to the at least one evaporator.

20. The refrigerated display case of claim 11, wherein the rod heater further comprises a first washer crimped onto the rod heater adjacent a first end of the rod heater; and a second washer crimped onto the rod heater adjacent a second end of the rod heater.

* * * * *